United States Patent [19]

Dumeah

[11] 3,709,099
[45] Jan. 9, 1973

[54] CONVERTIBLE RACK AND PINION STEERING GEAR

[75] Inventor: Peter J. Dumeah, Royal Oak, Mich.

[73] Assignee: TRW Inc., Cleveland, Ohio

[22] Filed: Aug. 11, 1970

[21] Appl. No.: 62,924

[52] U.S. Cl..................91/54, 91/375 A, 92/136, 180/79.2
[51] Int. Cl............................F01b 29/04, F15b 9/10
[58] Field of Search..........91/375 A, 375 R, 54, 431; 92/136, 59; 74/498, 422; 180/79.2

[56] References Cited

UNITED STATES PATENTS

| | | | |
|---|---|---|---|
| 3,611,877 | 10/1971 | Baxter | 91/431 |
| 2,565,929 | 8/1951 | Onde | 180/79.2 |
| 3,267,763 | 8/1966 | Merritt | 74/498 |
| 3,312,148 | 4/1967 | Adams | 92/136 |
| 3,347,109 | 10/1967 | Adams et al | 74/498 |

FOREIGN PATENTS OR APPLICATIONS 976,661   12/1964   Great Britain..........................74/498

Primary Examiner—Paul E. Maslousky
Attorney—Hill, Sherman, Meroni, Gross & Simpson

[57] ABSTRACT

A rack and pinion gear steering assembly constructed and arranged so as to readily accommodate either manual or power steering within the same basic design configuration. The assembly comprises a steering shaft, a pinion gear, a rack tube which is extended longitudinally to provide a fluid power cylinder, a rack within the tube, a piston rod connected to the rack, a piston mounted on the rod and located within the power cylinder, fluid connections formed on the extended portion of the tube for openly communicating with the power cylinder on the opposite sides of the piston and a fluid servovalve connected between the steering shaft and the pinion gear to control the flow of pressurized fluid between a fluid pump and the opposite sides of the piston.

10 Claims, 18 Drawing Figures

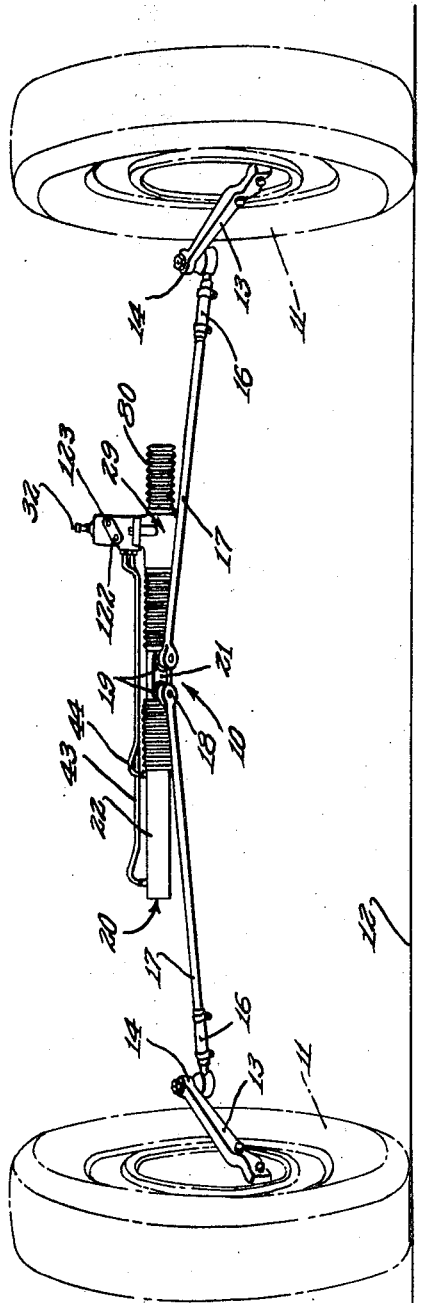
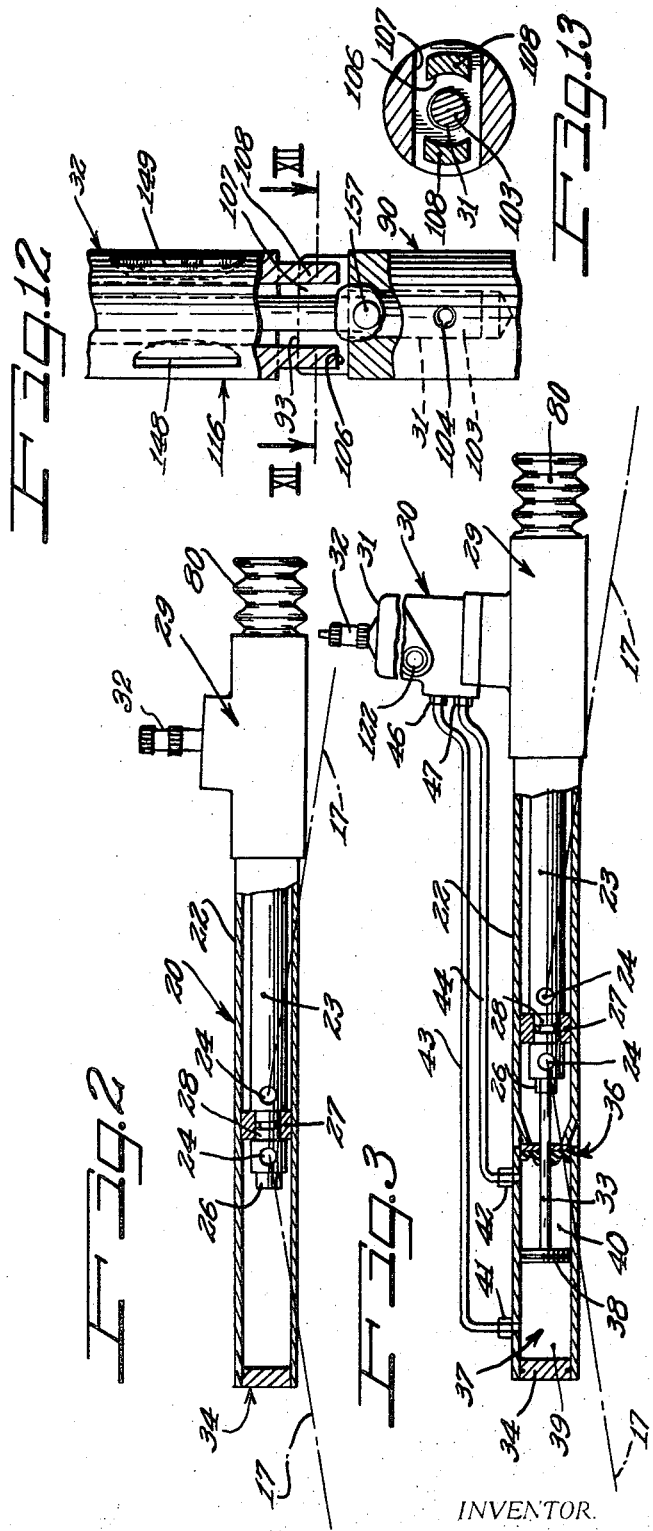

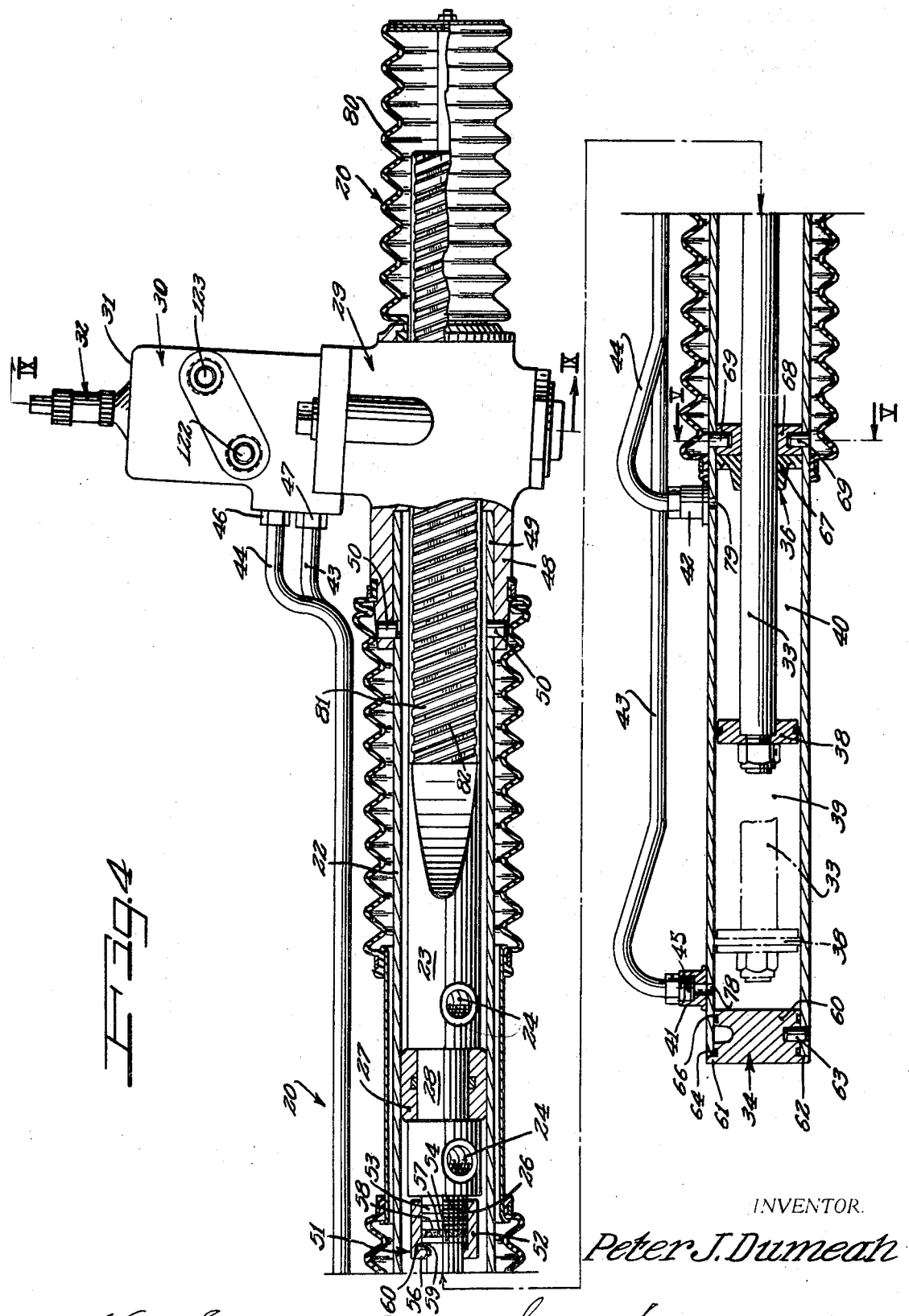

INVENTOR.
Peter J. Dumeah

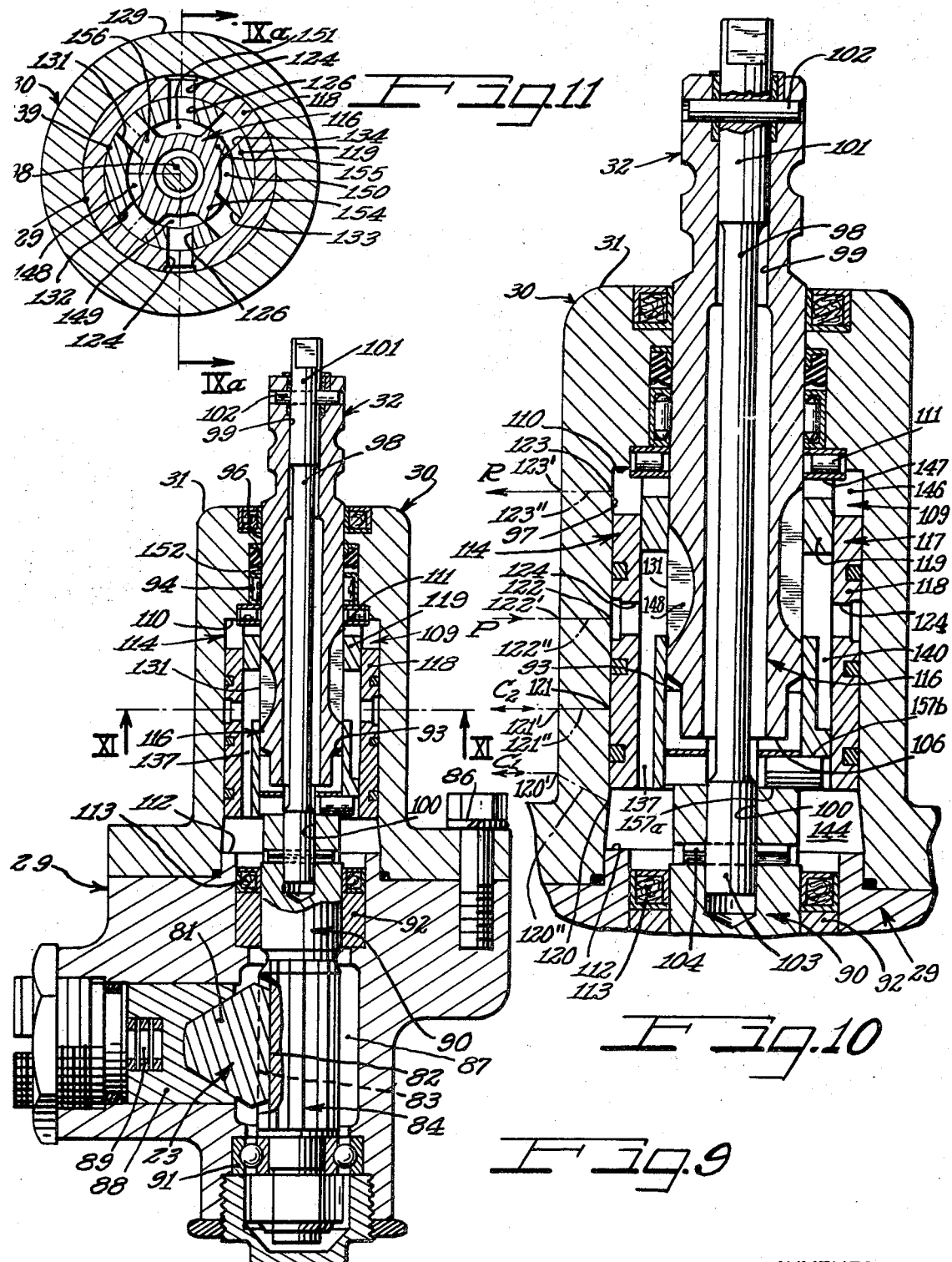

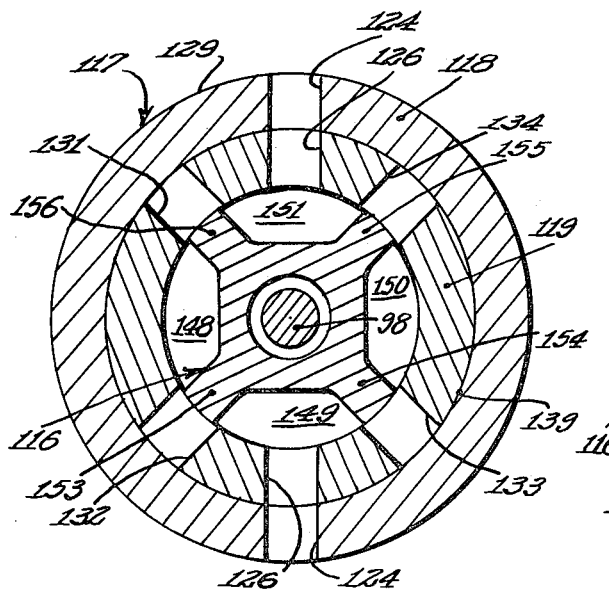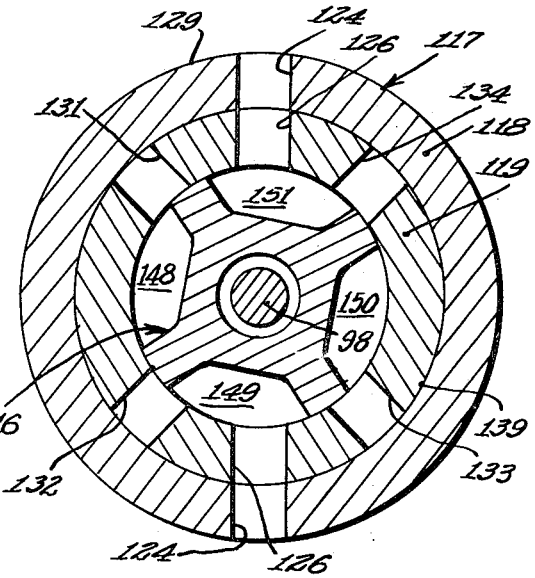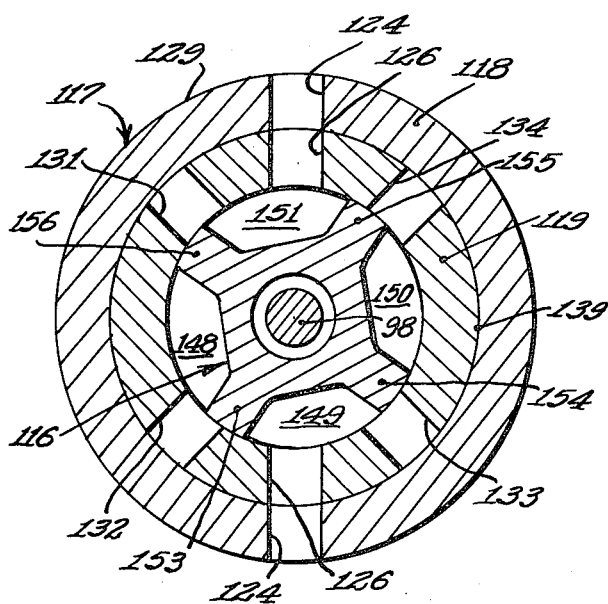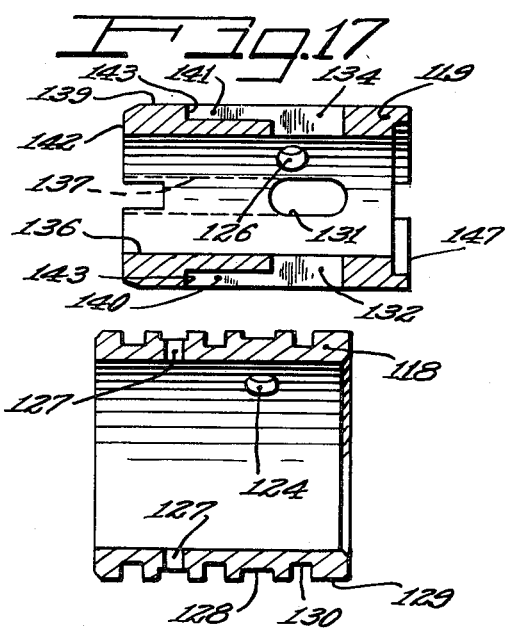

CONVERTIBLE RACK AND PINION STEERING GEAR

BACKGROUND OF THE INVENTION

This invention relates generally to the field of vehicular steering and more particularly to center take-off rack and pinion gear vehicular steering assemblies.

Two arrangements are commonly employed for connecting the dirigible road wheels of a vehicle through tie rods to a rack and pinion gear steering assembly. In one arrangement the tie rods are connected to the opposite ends of the rack. In the other arrangement they are connected to the center of the rack through a slot formed in the rack tube. The present invention relates primarily to the latter arrangement, which is commonly referred to as a "center take-off" arrangement.

Center take-off systems find wide utility both in manual and power steering applications. Heretofore, however, the two arrangements have been considered essentially independently of one another from a design point of view and little regard has been given to the design of a single basic configuration to accommodate both arrangements. Consequently, neither arrangement has enjoyed the reduced manufacturing costs which would normally result from a quantity production equal to the total production of the two individual arrangements.

The present invention recognizes this deficiency in the art of center take-off rack and pinion gear steering. It provides an arrangement susceptible with little modification to either manual or power operation. In either case the basic components are constructed identically and are virtually interchangeable. Merely by simple modification of certain parts and the addition of other parts a manual steering arrangement can be quickly and easily converted to power operation. The attendant inventory problems and manufacturing costs arising out of the provision of two basically different design criteria for manual and power steering, instead of only one, are substantially reduced or eliminated.

SUMMARY OF THE INVENTION

The present invention comprises a rack tube extended beyond the length necessary to accommodate the axial length of travel of the rack carried therein. The extended portion of the tube is fitted with a pressure seal and an end cap to form a fluid power cylinder within the tube at one end of the rack. A piston rod extends from the end of the rack adjacent the power cylinder and enters the power cylinder through the seal. A piston is mounted on the rod within the power cylinder and fluid connections are mounted on the tube so as to communicate respectively with the fluid pressure chambers located on opposite sides of the piston.

Savings in manufacture and inventory requirements are objects of the invention. Salient features of the invention calculated to attain these objects include, for example, a coupling interconnecting the rack and piston rod to accommodate limited axial misalignment between the two, the extension of the rack tube to provide, in a single, continuous tube, the power cylinder for power steering operation, a pressure seal easily mounted within the tube to form the inner wall of the power cylinder and the provision of a "V" block bushing and a similarly shaped portion of the rack to restrain the rack against twisting due to the "center take-off" loads acting thereon.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

BRIEF DESCRIPTION OF THE DRAWING

FIG. 1 is a partially schematic view of a vehicular rack and pinion gear steering assembly constructed in accordance with the principles of the present invention.

FIG. 2 is a partially schematic view of the rack and pinion gear assembly shown in FIG. 1 adapted for manual operation.

FIG. 3 is similar to FIG. 2 but shows the rack and pinion gear assembly adapted for power operation.

FIG. 4 is an enlarged sectional view of the rack and pinion gear assembly shown in FIGS. 1 and 3.

FIG. 9 is an enlarged sectional view of a portion of the assembly shown in FIG. 4, the general arrangement of which being illustrated as it appears along line IX—IX of FIG. 4, but an internal valving arrangement of which being illustrated as it appears along line IXa—IXa of FIG. 11.

FIG. 10 is an enlarged view of a portion of the apparatus shown in FIG. 9.

FIG. 11 is a slightly enlarged sectional view taken along lines XI—XI of FIG. 9 and illustrates the true relative disposition of parts when the valve arrangement is in a neutral position.

FIG. 12 is an elevational view of certain parts of the apparatus shown in FIG. 9.

FIG. 13 is a cross-sectional view taken along lines XIII—XIII of FIG. 12.

FIG. 14 is an enlarged view of the valving arrangement shown in FIG. 11 with the valve in a neutral position.

FIGS. 15 and 16 are similar to FIG. 14 but illustrate respectively the relative disposition of parts which obtains when the steered wheels are being turned leftwardly and rightwardly.

FIGS. 17 and 18 are respectively sectional views of a pair of valve elements of the valving arrangement of the invention.

DESCRIPTION OF THE PREFERRED EMBODIMENTS

Figure 5:
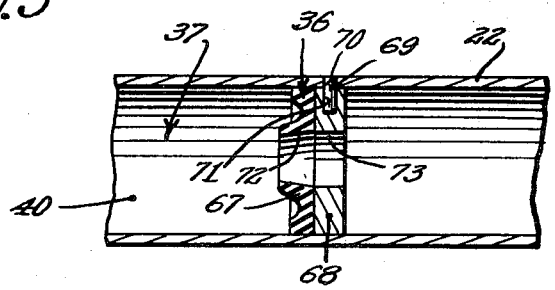
FIG. 5 is an enlarged sectional view of a portion of the rack tube shown in FIG. 4 which illustrates certain details of a pressure seal enclosing one end of the power cylinder formed within the rack tube.
Figure 6:
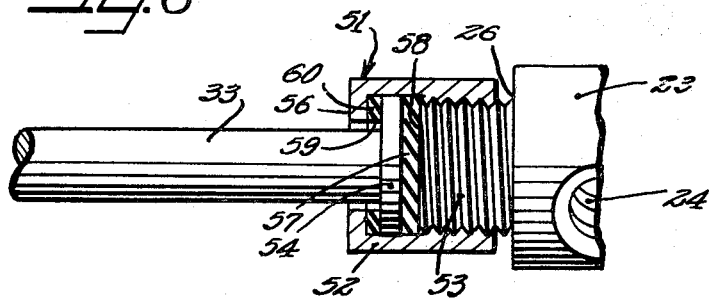
FIG. 6 is an enlarged view of a coupling joining the adjacent ends of the piston rod and rack shown in FIG. 4.

FIG. 1 illustrates a partially schematic representation of a steering assembly 10 constructed in accordance with the principles of the present invention and connected to a pair of steerable vehicular wheels 11 supported on a roadway 12. The assembly 10 comprises a steering arm 13 mounted on each of the wheels 11,11, a socket 14 mounted on each steering arm 13, a pair of tie rods 17,17, one end 16 of each of which is connected to a corresponding socket 14.

An opposite end 18 of each of the tie rods 17 is connected by means of a ball stud 19 to the rack and pinion gear assembly indicated generally at reference numeral 20. The studs of the ball studs 19 extend through a slot 21 formed in a rack tube 22 of the assembly 20.

The assembly 20 may be mounted in any suitable manner on the frame of the vehicle. As mounted the rack tube 22 is maintained stationarily relative to the frame. The rack, on the other hand, moves back and forth within the tube 22 in response to rotation of the steering wheel and, in doing so, moves the tie rods 17 back and forth to rotate the steered wheels 11 relative to the frame.

The rack and pinion gear assembly 20 is constructed and arranged to accommodate manual or power steering within the same basic design criteria. Thus, for manual steering a simplified version of the assembly 20 is utilized. To provide power steering, however, it is only necessary to add to the simplified version several components peculiar to power steering operation. The basic components of the simplified version of the assembly 20 are identical to those of the power steering version.

The embodiment of the assembly 20 disclosed in FIG. 1 is equipped for power steering operation. A simplified manual steering version of the same basic assembly 20 is shown in FIG. 2. While the showing of FIG. 2 is primarily schematic, it may be ascertained that the rack, indicated at reference numeral 23 is bored as at 24,24 adjacent one end 26 to receive the studs of the ball studs 19,19. The tie rods 17,17 are indicated in phantom lines as terminating at the bores 24,24 and since the slot 21 of the tube 22 through which the studs of the ball studs 19 extend is located substantially centrally in respect to the length of the tube 22, the assembly 20 may be conveniently referred to as a "center take-off" rack and pinion steering gear assembly. This is in contrast to "end take-off" rack and pinion gear design in which the adjacent ends of the tie rods are connected to the opposite ends of the rack.

The rack 23 is supported for reciprocal movement within the tube 22 by means of a bearing block 27 which is mounted on a reduced diameter portion 28 of the rack 23 between the bores 24,24. The tube 22 is mounted in fixed assembly on a gear housing 29 in which certain operative parts are contained, and also mounted on the gear housing 29 is a valve housing 30 from an upper end 31 of which an operating shaft 32 projects. As assembled on a vehicle the total steering assembly also includes a steering column coupled to the operating shaft 32 for joint rotation and a steering wheel or the like operating mechanism mounted on the steering column and under the operation and control of the operator of the vehicle.

A power steering version of the assembly 20 is shown in FIG. 3 and by comparison with the embodiment shown in FIG. 2 it may be noted that a conversion from manual to power operation requires no modification of the basic components of the manual version but instead requires only the addition of certain parts peculiar to power steering operation.

Thus, in the embodiment shown in FIG. 3 a piston rod 33 is connected to the end 26 of the rack 23 and extends toward an end cap 34 which closes off one end of the rack tube 22. Interiorly of the end cap 34 a pressure seal indicated generally at reference numeral 36 is mounted to provide, between it and the end cap 34, a fluid power cylinder 37 within which a piston 38 mounted on the piston rod 33 resides.

The piston 38 partitions the power cylinder 37 into a pair of fluid pressure chambers 39 and 40 and mounted on the tube 22 are a pair of conduit connections 41 and 42 for connecting a pair of fluid conduits 43 and 44 to the opposite ends of the power cylinder 37. Conduits 43 and 44 are also connected to a pair of fittings 46 and 47 mounted on the housing 30, the operating mechanism housed therein being modified to accommodate power steering operation.

In all essential respects and except for the addition of various parts which are essential to power steering operation, the manual version of the present invention disclosed in FIG. 2 and the power version disclosed in FIG. 3 are identical.

FIG. 4 comprises a more detailed showing of the power steering version illustrated in FIG. 3. As shown, the gear housing 20 may be more particularly characterized as comprising a tubular coupling 48 which telescopically receives an inner end 49 of the rack tube 22. The rack tube 22 is secured to the collar 48 by means of a plurality of pins 50 which are press-fitted into a series of registered radial bores formed in the tube 22 and collar 48.

The piston rod 33 is connected to the rack 23 by means of a coupling 51 which comprises a tubular sleeve 52 threaded to a shaft 53 projecting from the outer end 26 of the rack 23. An enlarged diameter flange 54 is formed on the piston rod 33 and is maintained within the sleeve 52 by means of a radially inturned flange 56 formed at the outer end of the sleeve 52. A resilient member 57 is sandwiched between the flange 54 and an outer end 58 of the threaded shaft 53 and another resilient member 59 is sandwiched between the inturned flange 56 of the sleeve 52 and the piston rod flange 54.

The diameter of the piston rod 33 is slightly less than the diameter of a bore 60 through which the rod extends into the sleeve 52, and the diameter of the piston rod flange 54 is slightly less than the inside diameter of the sleeve 52. By virtue of this relationship between the various diameters and also by virtue of the resilient members 57 and 60 the coupling 51 is able to accommodate limited misalignment between the axes of the rack 23 and the piston rod 33 without the imposition of unusual loads or wearing effects on the parts.

The end cap 34 comprises a cylindrical body 60 which telescopes into the rack tube 22 and a radially outwardly extending flange 61 which abuts an end wall 62 of the tube. The end cap 34 is maintained in assembled position by means of suitable pin fastener 63 and a pair of seals 64 and 66 are mounted on the end cap 34 to provide a fluid type seal thereacross.

As shown in FIG. 5 the pressure seal 36 comprises a resilient seal member 67 and a rigid backing plate 68. The seal 36 is mounted in the tube 22 merely by press-fitting a plurality of pins, one of which is indicated at reference numeral 69, into registered bores 70 and 71 formed in the tube 22 and the backing plate 68. The resilient member 67 is then backed against the plate 68, such engagement being maintained during operation as a consequence of the fluid pressure within the power cylinder 37. The resilient member 67 and the backing plate 68 are centrally apertured as at 72 and 73 to accommodate the piston rod 33.

Figure 7:
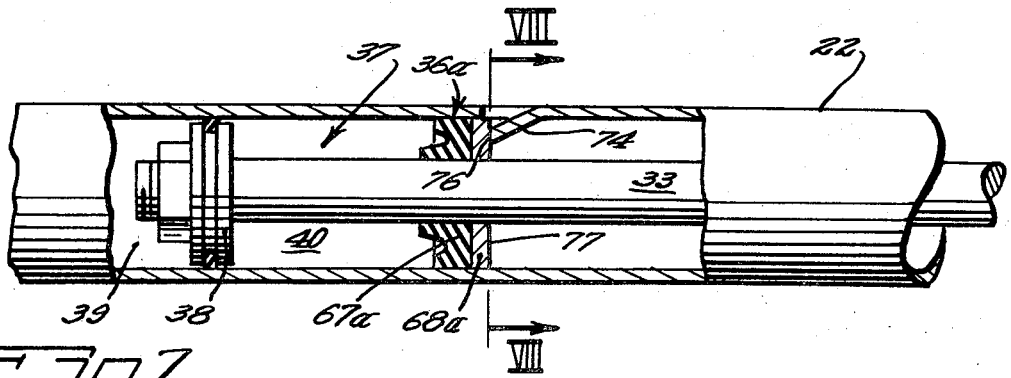
FIG. 7 is an enlarged sectional view of the rack tube illustrating another embodiment of the pressure seal shown in FIG. 5.
Figure 8:
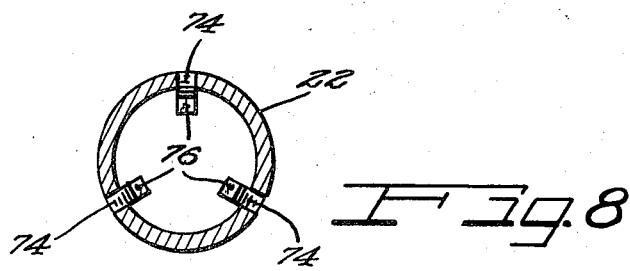
FIG. 8 is a sectional view taken substantially along lines VIII—VIII of FIG. 7.

FIGS. 7 and 8 are illustrative of another embodiment of a pressure seal for sealing the posterior end of the power cylinder 37. The seal assembly, which is indicated generally at reference numeral 36a, comprises a resilient member 67a, which abuts a backing plate 68a. In this embodiment, however, the backing plate is restrained against axial movement under the force of the pressurized fluid within the power cylinder 37 by virtue of a plurality of radially spaced tabs or tines 74 formed in the rack tube 22. The tines 74 are formed by a punching operation or the like and extend respectively from a bight end in a sloped or radially inward direction as indicated in FIG. 7. An end face 76 of each of the tines 74 is machined to present a flat radial shoulder against which an end wall 77 of the backing plate or washer 68a abuts.

Three tines 74 are provided in the embodiment shown in FIGS. 7 and 8, which equals the number of pins 69 provided in the embodiment shown in FIG. 5. The backing plate 68a is also apertured similar to plate 68 and the entire pressure seal 36a is assembled merely by inserting the backing plate 68a into the tube 22 until it is brought into contact with the tines 74 and then inserting the resilient member 67 into the tube and into abutting engagement with the backing plate 68a.

The conduit fittings 41 and 42 are stud welded to the rack tube 22, a most economical method of fastening. After the fittings are welded to the outer face of the tube 22 a pair of bores 78 and 79 are drilled through the fittings and through the rack tube 22 in alignment with threaded bores 45 formed in the fittings and extending partly therethrough to provide open communication of fluid pressure chambers 39 and 40 with the conduits 43 and 44. The aligned bores of the tube 22 and the fittings 41 and 42 are drilled in a single operation.

A plurality of protective flexible shields 80 may be mounted in surrounding relation to the rack tube 22 and the rack 23 to provide a relatively dirt-free enclosure, as will be understood by those skilled in the art.

As shown in FIGS. 4 and 9, one end portion 81 of the rack 23 is machined to a generally triangularly shaped cross section, as contrasted with the generally cylindrically shaped configuration of the remainder of the rack 23. One substantially flat face 82 of the machined portion 81, which portion extends through the gear housing 29, has formed thereon a series of rack teeth 83.

Referring to FIGS. 9 and 10, the rack teeth 83 are in meshing engagement with the teeth of a pinion gear 84 mounted in the gear housing 29, which gear housing is connected in fixed assembly by means of a plurality of threaded bolts 86 to the valve housing 30.

The pinion gear 84 is disposed in a gear chamber 87. In order to prevent longitudinal twisting of the rack 23 and to provide a suitable backup support, a bearing block 88 biased by means of an adjustable spring 89 is urged into snug bearing relation with the rack 23, complemental V-shaped surfaces being formed on the rack and the bearing block for that purpose.

The pinion gear 84, in the illustrated embodiment of the invention, forms an integral portion of a shaft 90, referred to from time to time hereinafter as a work output shaft. The shaft 90 is journalled for rotation within the gear housing 29 by means of bearing members 91 and 92 and terminates at an end wall 93 situated within the confines of the valve housing 30.

The work output shaft 90 is axially aligned with the work input shaft 32. The work input shaft 32 comprises the member to which the steering torque is imparted by the operator of the vehicle and steering movement of the steered wheels follows as an ultimate consequence of rotation of the work input shaft 32.

The shaft 32 is journalled for rotation in the valve housing 30 by means of a roller bearing 94 disposed within an axial bore 96 formed in the housing 30 and opening to an enlarged diameter valve chamber bounded circumferentially by a cylindrical valve chamber wall 97.

As will be described more fully hereinafter the work input shaft 32 and the work output shaft 90 are coupled together for limited relative rotation. In addition to that coupling arrangement, however, the shafts 32 and 90 are interconnected by means of a slender torsion rod 98 which is disposed within an axial bore 99 formed in the work input shaft 32 and within an axial bore 100 formed in the work output shaft 90. One end of the rod 98, indicated at 101, is connected fast to the work input shaft 32 for joint rotation therewith by means of a transverse pin 102. An opposite end 103 is connected by a similar pin arrangement 104 for joint rotation with the work output shaft 90.

As a consequence of the torsion rod 98 the work input shaft 32 can be rotated relative to the work output shaft 90 but in doing so must overcome a torque imposed by the rod 98 which resists such relative rotation.

The resilient torsional effect of the rod 98 produces a certain "feel of the road" for the operator of the vehicle and also produces a centering effect on the controller valve assembly, as will become clear hereinafter.

As shown in FIGS. 12 and 13, a distal end wall 106 of the work input shaft 32 axially overlaps the inner end wall 93 of the work output shaft 90. The shaft 90 is transversely slotted as indicated at 107, which slot receives a mating projection 108 of the work input shaft 32. The width of the slot 107 in a direction transverse to the axes of the shafts 32 and 90 is greater than the corresponding dimension of the projection 108 such that the shafts 32 and 90 may rotate relative to one another through a predetermined arc. Thereafter, however, the projection 108 is brought into abutting engagement with the walls of the slot 107 and shafts 32 and 90 rotate jointly. Because of this driving relation the coupling which includes the slot 107 and the projection 108 may be conveniently referred to as a limited relative rotational shaft coupling.

The cylindrical valve chamber wall 97 comprises the peripheral wall of the valve chamber indicated generally at reference numeral 109. The chamber 109 is substantially completely closed and is, with the exception of the ports hereinafter described, substantially fluid sealed. Comprising one radial end wall of the chamber 109 is a wall 110 formed in the valve housing 30 and a needle thrust bearing 111 which circumferentially surrounds the work input shaft 32. The bearing 111 accommodates axial loads imposed on the shaft 32 and, in combination with the bearing 94, enables the shaft 32 to extend substantially into the valve chamber 109 without additional bearing means, all resulting in a more compact and simplified arrangement.

An opposite radial end wall of the chamber 109 is indicated at reference numeral 112 in the gear housing 29, and a seal 113 circumferentially surrounds the work output shaft 90 and is disposed axially adjacent the bearing member 92.

Referring particularly to FIGS. 9, 10 and 11 a valve assembly indicated generally at reference numeral 114, is disposed within the valve chamber 109. Essentially, the valve assembly 114 is of the rotary type and comprises a pair of relatively rotatable valve members, one of which is indicated at reference numeral 116 and comprises an inner portion of the work input shaft 32, and the other of which is indicated generally at reference numeral 117 and comprises a pair of tubularly shaped valve elements indicated respectively at reference numerals 118 and 119.

The outside diameter of valve element 118 is substantially the same as the diameter of the valve chamber 109, while the inside diameter of the valve element 119 corresponds substantially to the outside diameter of the work input shaft 32.

On the other hand, the inside diameter of valve element 118 is slightly less than the outside diameter of element 119 so that, after the elements 118 and 119 are machined, element 119 is telescopically press-fitted into element 118 and thereafter the two elements comprise, in effect, a single valve member 117.

Communicating with the valve chamber 109 are four ports indicated respectively at reference numerals 120, 121, 122 and 123. Ports 120 and 121 may be conveniently referred to as cylinder ports, port 122 may be denominated a fluid inlet port and port 123 a fluid outlet or return port. Ports 120–123 communicate with corresponding conduit connections 120′–123′ through internal passages 120″–123″ formed in the valve or controller housing 31. Ports 120 and 121 (with which fittings 46 and 47 communicate) are connected to the opposite ends of a double-acting servomotor or power cylinder which, in turn, is operatively connected to the rack 23 for providing a power assist to the movement of the rack and consequently to the turning of the steered wheels. Port 122 is connected to a suitable source of pressurized fluid such as a main power fluid pump mounted on the vehicle and port 123 is connected to the return or low pressure side of the main power pump.

The valve assembly 114 controls the flow of operating fluid between ports 120–123 as a function of the relative rotational positioning of valve members 116 and 117. To perform this function the valve members are ported and passaged in the following manner.

The outer valve element 118 has a pair of radial bores 124,124 which register with corresponding bores 126,126 formed in the inner valve element 119. Angularly offset slightly from bores 124 are a pair of bores 127,127 formed in the outer valve element 118. The bores 124 communicate with a land 128 arranged in circumferentially continuous relation about an outer peripheral wall 129 of the outer valve element 118. Another circumferential land 130 is spaced from land 128 and it will be appreciated from FIG. 17 that land 128 constantly communicates bore 124 with the fluid inlet port 122 and land 130 constantly communicates bores 127 with the cylinder port 121.

The inner valve element 119 comprises four ports 131–134 opening through an inner wall 136 to the valve member 116. Ports 131 and 133 communicate respectively with axially extending slots 137 and 138 formed in an outer peripheral wall 139 and ports 132 and 134 communicate respectively with axial slots 140 and 141 also formed in the peripheral wall 139. Slots 137 and 138 open to an end wall 142 of the valve element 119 whereas slots 140 and 141 terminate at radial walls 143,143 short of the end wall 142. That portion of the valve chamber 109 between the end wall 142 of the valve element 118 and the radial wall 112 of the gear housing 29 comprises a valve chamber portion 144 which communicates only with the cylinder port 120. Another portion 146 of the valve chamber 109 which resides between an end wall 147 of the valve element 119 and the radial wall 110 of the housing 31 communicates only with the fluid outlet or return port 123.

The valve member 116 of the input shaft 32 is provided with a series of valving passages to complement those of the valve member 117 in the performance of the total valving function. Thus there is formed in the valve member 116 a series of longitudinally extending slots 148–151 formed in a peripheral wall 152 of the input shaft 32. The slots 148–151 are disposed along the axis of shaft 32 so as to be generally in axial alignment with bores 126,126 and 131–134 of the inner valve element 119. Slots 148 and 150 terminate between the end walls 142 and 147 of the valve element 119, whereas slots 149 and 151, while not extending axially to the end wall 142, do extend beyond the end wall 147 and are in open communication with the outlet port 123 through portion 146 of the valve chamber 109. A series of lands 153–156 separate the slots 148–151. As seen in FIG. 14 the circumferential dimension of lands 153–156 is slightly less than the circumferential extent of bores 131–134 so that, for example, in the relative position of the parts shown in FIG. 14, slot 148 communicates with slot 149 through the port 132.

In operation of the assembly 10 either of two general conditions may obtain. Either a torque is being applied to the input or operating shaft 32 for the purpose of turning the steered wheels or it is not.

When the input shaft 32 is not subjected to an operating torque the various valve parts assume the relative positions thereof shown in FIG. 14. These positions are assumed by virtue of the centering bias of the torsion rod 98 which, in an unstrained condition, maintains the input shaft 32 in a predetermined relative rotational position with respect to the output shaft 90.

In such position of the valve parts high pressure fluid entering the housing 31 through fluid inlet port 122 is conducted through the pairs of bores 124 and 126 and then into the slots 149 and 151 formed in the input shaft 32. Since all of the bores 131–134 are in open communication with each other, the fluid merely passes through the slots 149 and 151 into the valve chamber portion 146 and thence through the fluid outlet port 123 to the return or low pressure side of the main power fluid pump.

Although the ports 131 and 133 are in open communication with cylinder port 120, and ports 132 and 134 are in open communication with cylinder port 121, it is apparent that the pressure at both ports 120 and 121 is essentially identical and thus the entire high pressure fluid is merely conducted through the housing 31 from fluid inlet port 122 to fluid outlet port 123.

Assume that the operator of the vehicle on which the assembly 10 is mounted now imparts a torque to the input shaft 32 to rotate it in a rightward direction as shown in FIG. 15. The valve members 116 and 117 are then relatively rotated in a manner so that the high pressure fluid is conducted from port 122 through bores 124 and 126 into the slots 148 and 150 but now such slots do not communicate with bores 131 and 133, but instead communicate only with bores 132 and 134. Thus, the high pressure fluid is conducted through passages 140 and 141 to the bores 127, and thence to the cylinder port 121 formed in the housing 31.

The end of the servomotor or power cylinder connected to port 121 is thereby pressurized, thus causing movement of the rack 23 to which the movable member or piston rod of the power cylinder is attached. The fluid from the opposite end of the power cylinder is conducted to cylinder port 120 and into valve chamber portion 144. Passages 137 and 138 communicate with valve chamber portion 144 to conduct the fluid therein through ports 131 and 133 and thence into slots 149 and 151 of the input shaft 32, from which the fluid passes into valve chamber portion 146 and thence to the return or fluid outlet port 123. So long as torque is imparted to the input shaft 32 tending to rotate it in a clockwise direction, the valve member 116 of the shaft 32 will maintain the same relative position to the valve member 117 as that shown in FIG. 15 and the high pressure fluid will continue to be conducted to cylinder port 121, tending to cause movement of the rack 23 in a direction so as to rotate the output shaft 90. The shaft 90 is coupled for joint rotation to the valve member 117 by means of a locking pin 157 press fit into a pair of registered bores 157a and 157b formed respectively in the output shaft 90 and the valve member 117. Thus as the output shaft 90 is rotated by the rack 23 and the pinion gear 84, so also is the valve member 117, and in the same direction of rotation as the input shaft 32. Therefore, so long as the input shaft 32 is rotated in a clockwise direction, the valve member 117 will also rotate in a clockwise direction, but will lag the input shaft 32 by an angle substantially as shown in FIG. 15.

When the rotational torque is released from the operating shaft 32 the high pressure fluid will continue to flow from the cylinder port 121 to the corresponding end of the power cylinder so long as the lands 153-156 continue to hydraulically separate ports 131-134. However, after rotation of the output shaft 90, and thus the valve member 117, continues and rotation of the input shaft 32 ceases, the valve member 117 will eventually assume the same relative position to valve member 116 as is shown in FIG. 14. When this condition obtains, the high pressure fluid will again pass from the fluid inlet port 122 to the fluid outlet port 123 substantially directly through the housing 31 and the turning effect imparted to the steered wheels will cease.

If the operating shaft 32 is rotated in a counterclockwise direction the valve parts will assume the relative disposition thereof shown in FIG. 16. In that position of the valve members 116 and 117 the high pressure fluid flows from the fluid inlet port 122, then through passages 124 and 126 into slots 148 and 150. These two slots now communicate, however, with ports 131 and 133, rather than ports 132 and 134, and thus the high pressure fluid now flows through the passages 137 and 138 to the valve chamber portion 144. From there the high pressure fluid flows out of the cylinder port 120 to its corresponding end of the power cylinder and thereby has the effect of turning the steered wheels in a direction opposite to the direction in which they were turned when the valve members 116 and 117 were in the relative position thereof shown in FIG. 15.

The fluid returning from the opposite end of the power cylinder flows through cylinder port 121 and thence into passages 140 and 141, from which it flows through ports 132 and 134 and into slots 149 and 151 of the input shaft 32. From slots 149 and 151 the return fluid flows into valve chamber portion 146 and thence back to the main power fluid pump through the fluid outlet port 123.

Once again, the operation of the power cylinder has the effect of moving the rack 23 in a manner such that the output shaft 90, and thus the valve member 117, which is coupled to the shaft 90 by means of the locking pin 157 for joint rotation, is rotated in the same direction as is the input shaft 32, but lags the rotation of shaft 32 by a predetermined angle as is shown in FIG. 16. When the operator of the vehicle stops rotating the input shaft 32, the output shaft 90 will continue to rotate until the valve members 116 and 117 are so disposed as to communicate the fluid inlet port 122 substantially directly with the output port 123. The centering bias of the torsion rod 98 then rotates the valve members 116 and 117 back to the neutral position thereof shown in FIG. 14.

Generally, the oil utilized in the fluid operating circuit is lighter than the gear lubricating oil. For example, the oil circulated by the main power fluid pump through the housing 31 to operate the power cylinder is lighter than the oil which is packed within the gear housing 29 to lubricate the rack 23 and pinion gear 84. By virtue of the present invention the lighter operating oil is completely separated from the rack and pinion gear and thus mixing of the lighter and heavier oils is avoided.

Furthermore, the configuration of the valve elements 118 and 119 which, when press-fitted together serve as a completely unitary valve member 117, enables such parts to be economically formed since all of the ports and passages of both elements open to either the inner or outer peripheral walls or to the end walls of the individual elements in their disassembled condition. Consequently, difficult machining of longitudinal flow passages between the peripheral walls of the valve member 117 is avoided.

Although minor modifications might be suggested by those versed in the art, it should be understood that I wish to embody within the scope of the patent warranted hereon all such modifications as reasonably come within the scope of my contribution to the art.

What I claim is:

1. A center take-off rack and pinion gear steering assembly comprising
   a gear housing,
   a pinion gear on said housing, a rack tube mounted on said housing, a rack carried for axial movement within said tube, rack teeth formed on said rack for meshing with said pinion gear, a rack tube end cap sealing off one end of said tube, a fluid pressure seal mounted on said tube inwardly of said one end for providing within said tube a power cylinder, a piston rod in said tube projecting through said fluid pressure seal into said power cylinder and having a piston mounted thereon for partitioning said power cylinder into a pair of fluid pressure chambers, coupling means interconnecting the adjacent ends of said rack and said piston rod for joint axial movement, means including a fluid control valve for directing fluid to and from fluid pressure chambers, and means on said rack disposed axially between said rack teeth and said piston rod for receiving the ends of a pair of tie rods.

2. The invention as defined in claim 1 wherein said coupling means comprises a resilient member for accommodating limited axial misalignment between said rack and said piston rod.

3. The invention as defined in claim 1 wherein said coupling means comprises means forming a hollow cylindrical collar connected in fixed assembly to said adjacent end of said rack, an enlarged head formed on said adjacent end of said piston rod within said collar and having an outside diameter slightly less than the inside diameter of said collar to permit limited axial misalignment between the adjacent ends of said rack tube and said piston rod, a pair of resilient members within said collar sandwiching said enlarged head snugly therebetween, and means forming an inturned restraining flange on said collar for maintaining said head and said resilient members in assembled relation within said collar.

4. The invention as defined in claim 1 wherein said fluid pressure seal means comprises a rigid backing plate, a resilient seal member butting against said backing plate, and means blocking axial movement of said backing plate under the force of pressurized fluid in said power cylinder, said backing plate and said seal member being centrally apertured to receive said piston rod.

5. The invention as defined in claim 4 wherein said blocking means comprises a plurality of circumferentially spaced and aligned radially extending apertures in said rack tube and in said backing plate, and pin members press-fitted in said apertures for locking said backing plate to said rack tube.

6. The invention as defined in claim 4 wherein said blocking means comprises a plurality of circumferentially spaced radially inwardly projecting tines formed in said rack tube for receiving said backing plate in abutting relation.

7. The invention as defined in claim 1 wherein said rack comprises a triangularly shaped rack portion and including a complementarily shaped bushing mounted in said housing for receiving said triangularly shaped rack portion in sliding engagement to prevent twisting of the rack about its longitudinal axis and for maintaining a static load on the rack to ensure pinion gear to rack preload.

8. A rack and pinion gear steering assembly comprising a gear housing, a pinion gear and an operating shaft mounted on said housing, a fluid control valve in said housing operatively connected to said pinion gear and said operating shaft, means forming a fluid inlet, a fluid outlet and a pair of working ports in said housing communicating with said control valve, a rack tube mounted on said housing, a rack mounted in said tube and having rack teeth meshing with said pinion gear, means forming a power cylinder in said tube on one side of said rack, a piston rod connected to said rack for joint axial movement and extending into said power cylinder, a piston on said rod dividing said power cylinder into a pair of fluid pressure chambers, conduit means communicating said working ports and said fluid pressure chambers respectively, and means on said rack between said rack teeth and said piston rod for receiving the adjacent ends of a pair of tie rods, said power cylinder forming means comprising an end cap closing off one end of said rack tube and a pressure seal mounted within said tube inwardly of said end cap.

9. The invention as defined in claim 8 and including coupling means interconnecting said rack and said piston rod for accommodating limited radial misalignment therebetween.

10. The invention as defined in claim 8 and including a rack bushing in said housing having a V-shaped groove therein, said rack having a V-shaped portion in sliding engagement with said bushing groove to prevent twisting of the rack from road impacts.

* * * * *